(12) United States Patent
Schofield

(10) Patent No.: US 8,695,491 B1
(45) Date of Patent: Apr. 15, 2014

(54) APPARATUS AND METHODS FOR SPLITTING A POMEGRANATE APART

(76) Inventor: Monica Nicole Schofield, Livermore, CA (US)

( * ) Notice: Subject to any disclaimer, the term of this patent is extended or adjusted under 35 U.S.C. 154(b) by 679 days.

(21) Appl. No.: 12/914,750

(22) Filed: Oct. 28, 2010

(51) Int. Cl.
| | |
|---|---|
| *A23N 15/02* | (2006.01) |
| *A23N 4/04* | (2006.01) |
| *A47J 17/00* | (2006.01) |
| *A47J 23/00* | (2006.01) |
| *A47J 25/00* | (2006.01) |
| *B26D 3/11* | (2006.01) |

(52) U.S. Cl.
USPC .................................. 99/538; 99/514; 99/537

(58) Field of Classification Search
USPC ........... 99/514, 515, 537, 538, 543, 545, 550, 99/557, 579; 30/113.2, 113.3, 114, 30/120.1–120.5
See application file for complete search history.

(56) References Cited

U.S. PATENT DOCUMENTS

| | | | | |
|---|---|---|---|---|
| 41,757 | A | * 3/1864 | Carpenter | .................... 30/113.2 |
| 1,256,439 | A | 2/1918 | Clark | |
| 2,063,136 | A | * 12/1936 | Weise | .......................... 30/120.3 |
| 2,634,728 | A | 4/1953 | Dale | |
| 2,818,097 | A | 12/1957 | Glanz | |
| 3,074,449 | A | 1/1963 | Mikulas | |
| 3,091,270 | A | 5/1963 | Sampson | |
| 4,462,156 | A | 7/1984 | Himelhoch | |
| 4,530,278 | A | 7/1985 | Sarig et al. | |
| 5,911,328 | A | * 6/1999 | Shampo | .......................... 211/40 |
| 2002/0104219 | A1 | 8/2002 | Olson | |

FOREIGN PATENT DOCUMENTS

IN 200800479 9/2010

OTHER PUBLICATIONS (Source: PRUNIT/July/2009 anil.cpro@gmail.com), CIPHET Develops Pomegranate Aril Extractor for Commercial Use, Indian Council of Agricultural Research, http://www.icar.org.in/node/589, Jul. 30, 2009, New Delhi, India.

* cited by examiner

*Primary Examiner* — Tu B Hoang
*Assistant Examiner* — Lindsey C Teaters
(74) *Attorney, Agent, or Firm* — Franklin & Associates International; Matthew F. Lambrinos

(57) ABSTRACT

An apparatus and methods for splitting apart a pomegranate fruit employ a pair of elongated splitting levers and a pivoting connecting mechanism, carried on the pair of elongated levers. Each one of the elongated levers has a penetrating end and a shape configured to enable the pair of elongated levers to be arranged in a substantially closed configuration in contact or contiguous lengthways with one another to form a penetrating structure to enable the elongated levers to be at least partially inserted into a pomegranate. The elongated splitting levers are hingedly connectable at the penetrating ends by the pivoting connecting mechanism which is configured to outwardly pivot the elongated splitting levers from the substantially closed configuration into a substantially open configuration in response to forcing the elongated splitting levers apart about a fulcrum.

17 Claims, 6 Drawing Sheets

APPARATUS AND METHODS FOR SPLITTING A POMEGRANATE APART

FIELD OF THE INVENTION

The present invention relates to a pomegranate tool and, more particularly, to an apparatus and methods for splitting a pomegranate apart.

BACKGROUND OF THE INVENTION

A pomegranate (punica granatum) has been known since ancient times and is mentioned in the Old Testament of the Bible. The pomegranate is the fruit of a small deciduous tree native to Asia having a tough reddish skin (also called a rind) and contains many seeds that are each enclosed in a juicy, mildly acidic pulp jacket, referred to as an aril. The pulp jacket, as well as the seeds are edible, while the skin and thicker white membranes between the arils are not generally edible or at least desirable for consumption.

The pomegranate is a globus fruit surmounted by a crown of calyx lobes. The pomegranate may be as small as an orange or as large as a grapefruit. The pomegranate has a thick though fleshy rind often red in color. Inside the fruit are tiny juice sacks (arils) each containing a small quantity of sweet red juice. Groups of arils within the core of the fruit are encased in the white membranes similar in texture and sourness to a lemon peel. In its natural state, arils are grouped together and connected by these white membranes forming a pattern within the fruit similar to sections within an orange.

Up to the present time there is no acceptable apparatus in the prior art for manually opening a pomegranate to extract the arils therefrom. Accordingly, a need exists for the present invention which is an apparatus and method for splitting a pomegranate apart.

SUMMARY OF THE INVENTION

According to one aspect of the present invention, there is provided an improved pomegranate splitting apparatus. The apparatus has a pair of elongated splitting levers; wherein each one of the elongated splitting levers has a penetrating end; and a pivoting connecting mechanism, carried on the pair of elongated levers. Each one of the elongated levers has a penetrating end and a shape configured to enable the pair of elongated levers to be arranged in a substantially closed configuration in contact or contiguous lengthways with one another to form a penetrating structure to enable the elongated splitting levers to be at least partially inserted into a pomegranate. The elongated splitting levers are hingedly connectable at the penetrating ends by the pivoting connecting mechanism which is configured to outwardly pivot the elongated splitting levers from the substantially closed configuration into a substantially open configuration in response to spreading the elongated splitting levers apart about a fulcrum such that, when the elongated splitting levers are at least partially inserted into the pomegranate in the closed substantially closed configuration, forcing apart the elongated levers to the substantially open configuration gently splits a rind of the pomegranate apart to expose intact arils within the pomegranate.

According to another aspect, an apparatus for splitting apart a pomegranate is provided. The apparatus has a plurality of elongated splitting levers; wherein each one of the plurality of elongated splitting levers has a penetrating end; and a pivoting connecting mechanism for hingedly interconnecting the plurality of elongated splitting levers at the penetrating ends, the pivoting connecting mechanism defining a fulcrum about which the elongated levers pivot. Each one of the plurality of elongated levers has a shape configured to enable the plurality of elongated levers to be arranged in a substantially closed configuration in contact or contiguous lengthways with one another to form a penetrating structure to enable the plurality of elongated levers to be at least partially inserted into the pomegranate. The pivoting connecting mechanism is configured to outwardly pivot the plurality of elongated splitting levers from the substantially closed configuration into a substantially open configuration in response to spreading apart the elongated splitting levers such that, when the elongated splitting levers are at least partially inserted into the pomegranate in the closed configuration, forcing apart the elongated levers to the substantially open configuration gently splits a rind of the pomegranate apart to expose intact arils within the pomegranate.

According to yet another aspect of the present invention, there is provided an improved method for splitting a pomegranate apart. A method for splitting a pomegranate apart comprises arranging a plurality of elongated splitting levers together in a substantially closed configuration in which the elongated levers are in contact or contiguous lengthways with one another and in which penetrating ends of the levers are pivotally interconnected to form a penetrating structure; with the elongated splitting levers in the substantially closed configuration, inserting the pivotally interconnected penetrating ends into a pomegranate to penetrate the pomegranate; driving the elongated levers through the pomegranate; and forcing apart the levers about a fulcrum of the interconnected levers to open outwardly and gently split the rind of the pomegranate apart to expose the intact arils within the pomegranate.

BRIEF DESCRIPTION OF THE DRAWINGS

In order that the present invention may be more readily understood, reference will now be made to the accompanying drawings, in which.

DETAILED DESCRIPTION

Figure 1:
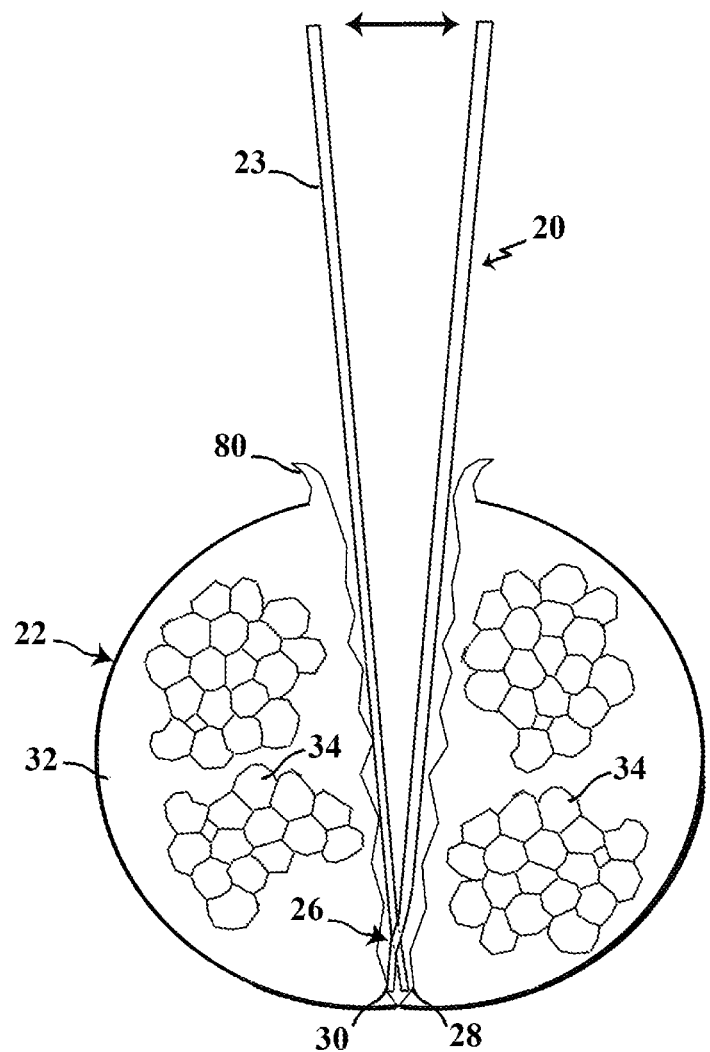
FIG. 1 is an elevational view showing one implementation of a pomegranate splitting apparatus, in use.
Figure 2:
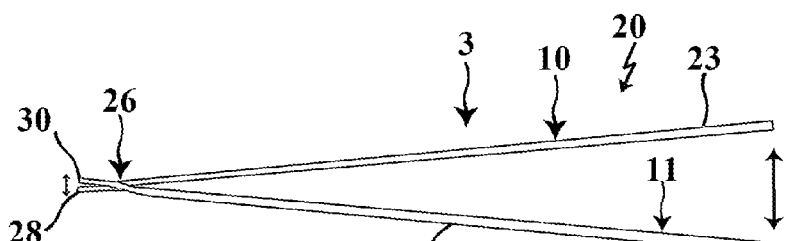
FIG. 2 is a side view of the apparatus of FIG. 1.
Figure 3:
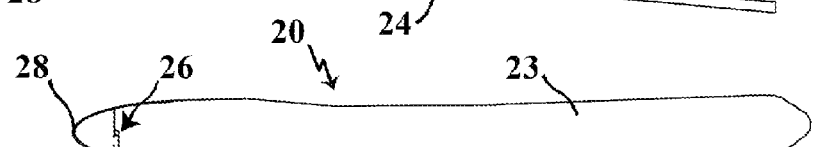
FIG. 3 is a side view taken in the direction of arrow 3 in FIG. 2.
Figure 4:
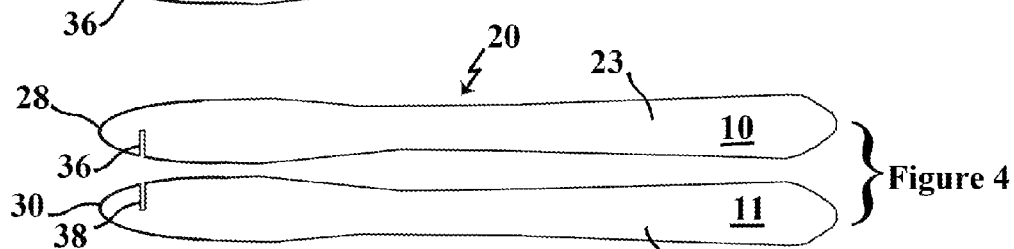
FIG. 4 is a side view of separated levers of the apparatus of FIG. 1.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Pomegranates have become increasingly popular in America because of their fine taste and numerous health benefits. It has been determined that a major obstacle for consumers purchasing and consuming pomegranates is the difficulty and mess associated with opening and eating the fruit. Pre-separated arils may be purchased from specialty grocery stores but have a much higher cost and shorter shelf life than the intact fruit.

Pomegranates contain hundreds of juice filled arils individually tethered to a leathery rind and core. It has been observed that manual separation of the arils from the rind included some combination of slicing or scoring with a knife plus beating the exterior with a mallet, submersing in water or manually picking apart with fingernails. These methods are problematic because each involves blindly cutting through the fruit or scoring the exterior, thus invariably damaging and wasting the arils within and releasing the highly squirtable red juice, which is notoriously staining of skin, clothing and kitchen surfaces.

Popular acceptance of the pomegranate as a convenience or snack food has not therefore been fully realized for a number of reasons. As already made apparent above, the fruit must be taken apart, i.e. the flesh bearing seeds must be separated from the exterior rind of the fruit and from the internal white membranes in the fruit, both of which are inedible. This is not a particularly simple task and hitherto now has not been achievable without the aforementioned problems. As will be explained in detail below, the apparatus and methods for splitting a pomegranate apart of the described embodiments allow the pomegranate to be split apart without aril breakage, and thus eliminating waste, stain and the expertise previously necessary.

Reference will now be made to the accompanying drawings in which like reference numerals refer to identical or functionally-similar elements throughout the separate views, and, in particular, FIGS. 1 through 4, which illustrate an apparatus for splitting a pomegranate apart according to one implementation.

In one implementation, an apparatus 20 for splitting a pomegranate 22 apart has a pair of elongated splitting levers. First and second elongated splitting levers may be for example substantially flat levers 23, 24 as shown in FIGS. 1 through 4. Each elongated splitting lever 23, 24 has a handle portion 10, 11 and a penetrating end 28, 30. Handle portion 10, 11 is located proximate or at an end of the lever opposite penetrating end 28, 30. A pivoting connecting mechanism 26 is configured to enable the penetrating end 28 of the first lever 23 to be pivotally interconnected with penetrating end 30 of the second lever 24 such that, in operation, the elongated splitting levers 23, 24 can be forced to pivot about a fulcrum of the pivoting connecting mechanism from a substantially closed configuration, in which the first and second levers are substantially closed together, to a substantially open configuration in which the handle portions 10, 11 are substantially open (see FIGS. 1 & 2).

In the substantially closed configuration, the elongated splitting levers 23, 24 are arranged in contact or contiguous lengthways with one another with the penetrating ends together or close to one another to form a penetrating structure to enable the apparatus to be easily inserted through a blossom portion 30 of the pomegranate 22 to a position in which the handle portions of the elongated splitting levers protrude from the blossom portion. Following insertion, the exposed handle portions 10, 11 can be forced pulled apart about the fulcrum to open outwardly to bring the levers into the substantially open configuration and gently split a rind 32 of the pomegranate 22 apart to expose intact arils 34 within the pomegranate 22. Note that FIG. 1 also shows the arils inside each half of the split apart pomegranate. The lever design causes the work done to be at a maximum near the rind of the fruit.

Elongated levers 23, 24 can be shaped different from that shown in FIG. 1. Other shapes can be employed that enable the pair of elongated levers to be arranged in contact or contiguous lengthways with one another to form a penetrating structure.

The pivotally connecting mechanism 26 can be any type of mechanism that enables manual pivoting of the elongated splitting levers between the open and closed configurations described above. In one implementation, the pivoting mechanism 26 comprises corresponding lever engaging notches or open ended slots 36, 38 formed in respective levers such that the penetrating ends 28, 30 of the first and second levers can be hingedly interconnected by mutually engaging the slots together to form a hinge. In one penetrating end 30, a notch or slot 38 extends transversely from a longitudinal side edge of the first lever 24 to define the open ended slot 38. A corresponding second open ended slot 36 is formed in an opposing position in the second lever 23 such that the first slot and second slot 38, 36 are slideably engage able together to form a pivoting mechanism hinge.

The bottom of the penetrating ends are convex shaped as shown in FIGS. 1-4 but can be of other shapes that are capable of forming a penetrating protrusion when the levers are in the substantially closed position. Also, whilst in FIGS. 1-4 the elongated splitting levers have a narrower mid section and an upper handle section 10, 11 that tapers outwardly from the narrower midsection, the elongated splitting levers 23, 24 can have other shaped profiles that perform the aforementioned handle functionality.

Furthermore, whilst in the example of FIGS. 1-4, the levers are configured such that the exposed handle portions 10, 11 can be forced pulled apart to open outwardly to bring the levers into the substantially open configuration and gently split the pomegranate rind 32, in other examples, the levers need not have such handle portions that extend from the pomegranate following insertion. In such cases, the levers are inserted entirely into the pomegranate and the levers are spread apart by applying force to the lever ends opposite the penetrating ends. The lever worked done is still substantially maximum near the rind of the fruit. In such cases, the apparatus is graspable in some way after insertion. For example, string can be attached to the lever ends opposite the penetrating ends to enable the apparatus to be manually grasped by hand.

The operating levers may disassemble and separate completely leaving simple, accessible surfaces for cleaning in dishwasher or by hand.

In one implementation, the elongated splitting levers can be formed or stamped from sheet metal or other suitably rigid material. As will be made more readily apparently below, the resulting structure is a pomegranate splitting apparatus that is simple and inexpensive to manufacture yet extremely effective in splitting the pomegranate apart compared to known devices. The apparatus may be formed from two single pieces of sheet material, such as sheet metal or the like, in an efficient, workmanlike, and economical manner. A plurality of these elongated splitting levers may also be readily stacked for transportation to the purchaser. The operating levers may be identical to each other. They can be made of stainless steel or chrome plated to permit easy cleaning and to prevent them from rusting. This also gives the sputter an attractive appearance.

In another implementation, each of the elongated levers have a blade or serrated edge (not shown) formed on longitudinal side edge at or proximate the penetrating end 28, 30 so as to provide a combined knife and pomegranate splitting system. In such as system, when the elongated splitting levers are disconnected from one another, each lever can be utilized as a knife for cutting. The elongated levers can be hingedly interconnected together on an as needed basis to form the pomegranate splitting system to split a pomegranate. Once, the pomegranate has been split apart, the knives can be disengaged and re-utilized as knives, for example to assist in cutting and split pomegranate, or stored for future use. The sharpness of the knives can vary depending on the application. By way of example, the knives can be of a sharpness sufficient for use as table knives or may be only as sharp as dull butter knives for child safe applications.

Figure 5:
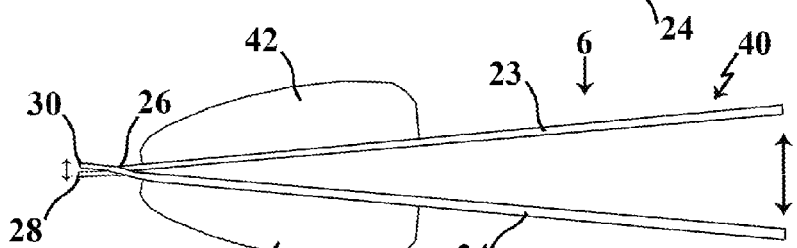
FIG. 5 is a side view of another implementation of a pomegranate splitting apparatus.
Figure 6:
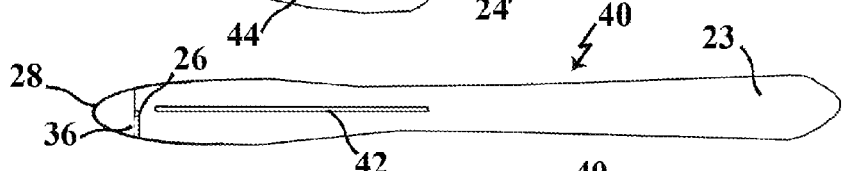
FIG. 6 is a side view taken in the direction of arrow 6 in FIG. 5.
Figure 7:
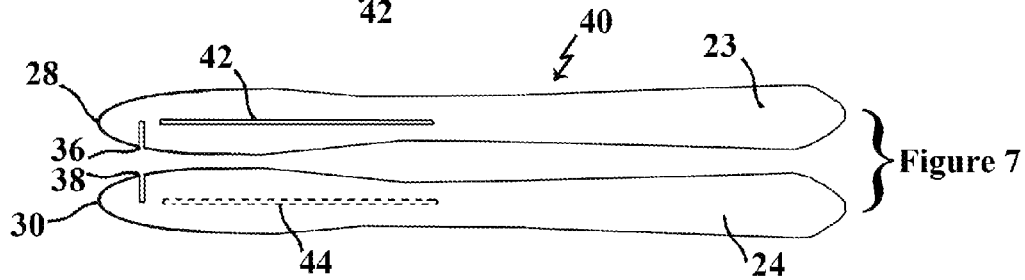
FIG. 7 is a side view of the separate levers of the apparatus of FIG. 5.

Reference will now be made to the accompanying drawings in which like reference numerals refer to identical or functionally-similar elements throughout the separate views, and, in particular, FIGS. 5 through 7, which illustrates a pomegranate splitting apparatus according to another implementation. In this implementation apparatus 40, is similar to apparatus 20, except that the pair of elongated levers 23, 24 each comprises an outwardly extending substantially perpendicular fin 42, 44 located near the pivotally connecting mechanism 26 to help gently split the rind 32 of the pomegranate 22 apart.

A method for splitting a pomegranate according to one implementation will now be described. The method can be performed utilizing the aforementioned described apparatus implementations.

1. Hingedly interconnect the pair of elongated splitting levers 23, 24 together at the penetrating ends 28, 30 using the pivoting mechanism 26.

2. Pivot the pair of elongated levers together into a substantially closed configuration in which the elongated levers form the penetrating structure.

3. With the elongated splitting levers in the substantially closed configuration, insert pivotally interconnected penetrating ends 28, 30 into the blossom portion 80 of the pomegranate 22 to penetrate the pomegranate and drive the elongated levers through the blossom portion leaving the handle portions protruding from the exterior of the blossom portion.

4. Manually or automatically pull apart handle portions to open outwardly and gently split the rind 32 of the pomegranate 22 apart to expose the intact arils 34 within the pomegranate 22 (See FIG. 1). For apparatus implementations in which there are no handles protruding from the pomegranate, the end portions of the levers extending substantially through the rind are pulled apart, for example manually by inserting fingers into the rind and pulling apart the end portions, or by inserting a device which can be manually or automatically operated to push/pull the levers apart.

The lever design causes the work done to be at a maximum near the rind of the fruit, so that when the splitters are pulled apart, the fruit starts splitting at the rind and progressing towards the center of the fruit. The spatting action works equally well on pomegranate fruit ranging in age from young and crisp rinded to older more leathery rinded fruit. Unlike pomegranate cutting tools, this device neither makes nor relies on assumptions about rind thickness which varies depending on variety and age of the fruit.

The spreading device is a simple hand tool that when inserted into an individual pomegranate, may be manipulated to cause expansion and splitting from within, without aril breakage, thus eliminating waste, stain and the expertise previously necessary when the fruit is processed for home or small scale use. The splitting device splits the rind to reveal intact arils rather like natural tree ripening of the pomegranate that results in the fruit rind splitting to reveal intact arils for seed dispersion.

In one implementation, a spreading device (not shown) can be inserted between the levers. The spreading device includes a corkscrew mechanism which is configured to spread the levers apart in response to manual or automatic twisting of the corkscrew mechanism.

Reference will now be made FIGS. 8 through 13, which illustrate an apparatus for splitting a pomegranate apart according to yet other implementations.

The apparatus may have a plurality of elongated splitting levers. By way of example, apparatus 50, which is configured for four ways splitting the pomegranate 32 apart, has four splitting levers 52 and a pivoting mechanism 58 for pivotally interconnecting the penetrating ends of the four splitting levers 52. Mechanism 58 is configured to pivotally connect penetrating ends of the first, second, third and forth elongated splitting levers 52 such that, in operation, the elongated splitting levers can be manually pivoted at the penetrating ends from a substantially closed configuration, in which the four elongated levers are arranged in contact or contiguous lengthways with one another to form a penetrating structure (FIG. 8), to a substantially open configuration in which all the elongated levers are substantially apart from one another (see FIG. 10).

In the substantially closed configuration, penetrating ends of the elongated levers 52 can be inserted into and penetrate the pomegranate blossom portion 30. The levers are then driven through the blossom portion. Following insertion, handle portions 64 of the levers are left protruding from the blossom exterior. A first pair 70 of adjacent handle portions 64 can be manually pulled apart from the second pair of adjacent handle portions 64 to open outwardly and separate a first pair 70 of levers 52 from a second pair 71 of levers 52 and gently split a rind 32 of the pomegranate 22 apart to expose intact arils 34 within the pomegranate 22 (see in particular FIG. 9). Thereafter, each pair of levers can be pulled apart to split the rind into quarters and further expose arils (see in particular FIG. 10).

The pivotally connecting mechanism 58 comprises male and female hinge components 62, 60 carried on each one of the splitting components and which are positioned to engage with corresponding male and female hinge components 62, 60 on a bottom end of the next adjacent splitting lever 52 when the four splitting levers 52 are placed together.

Each one of the four elongated levers 52 has a shape configured to enable the four elongated levers to be pivoted in contact or contiguous lengthways with one another to form a penetrating structure.

Figures 8, 11:
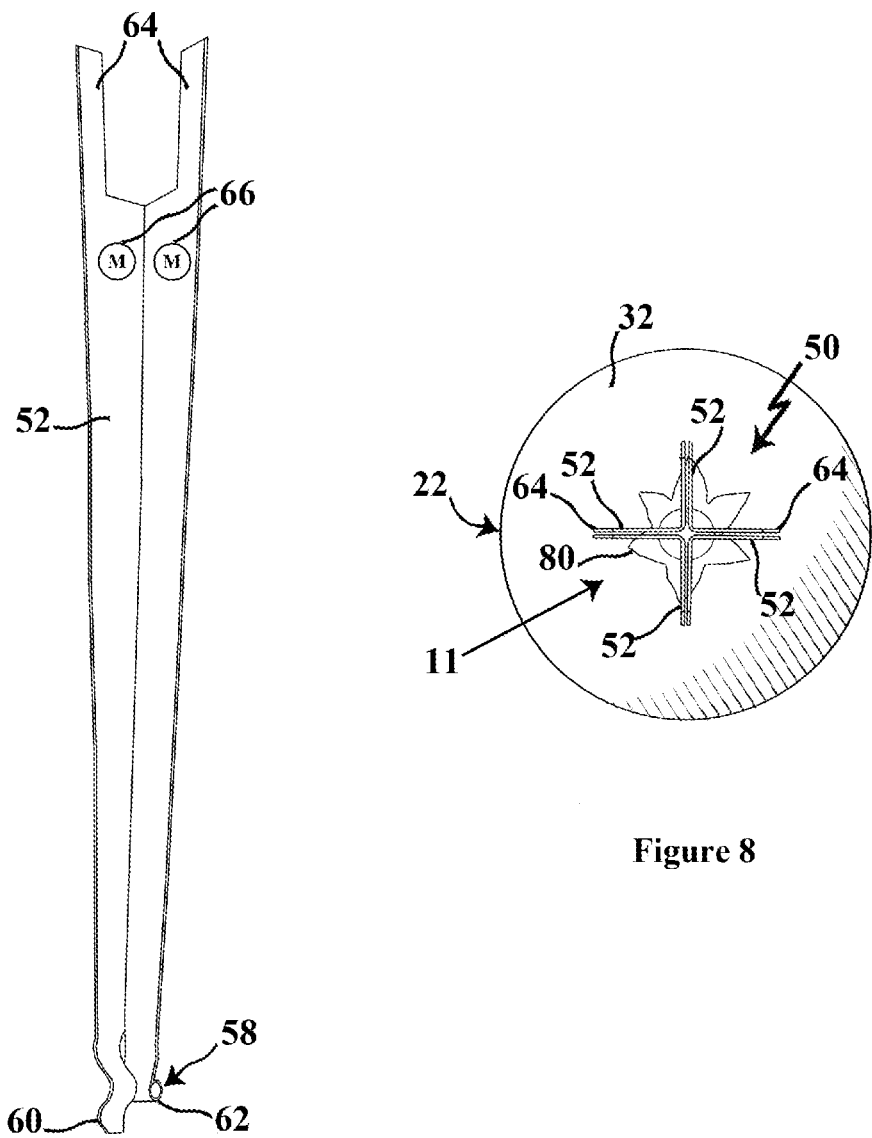
FIG. 8 is a top view showing an implementation of an apparatus for splitting a pomegranate apart and inserted into a blossom portion of a pomegranate.
FIG. 11 is an elevational side view of a pair of hingedly interconnected splitting levers of FIG. 8 taken in the direction of arrow 11 and shown in isolation.
Figure 9:
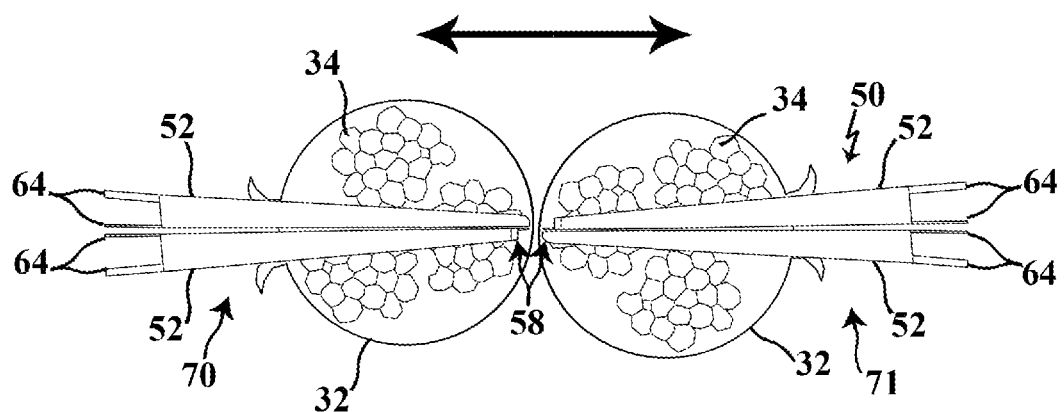
FIG. 9 is an elevational view showing the apparatus of FIG. 8 splitting the pomegranate in half according to one implementation.
Figure 10:
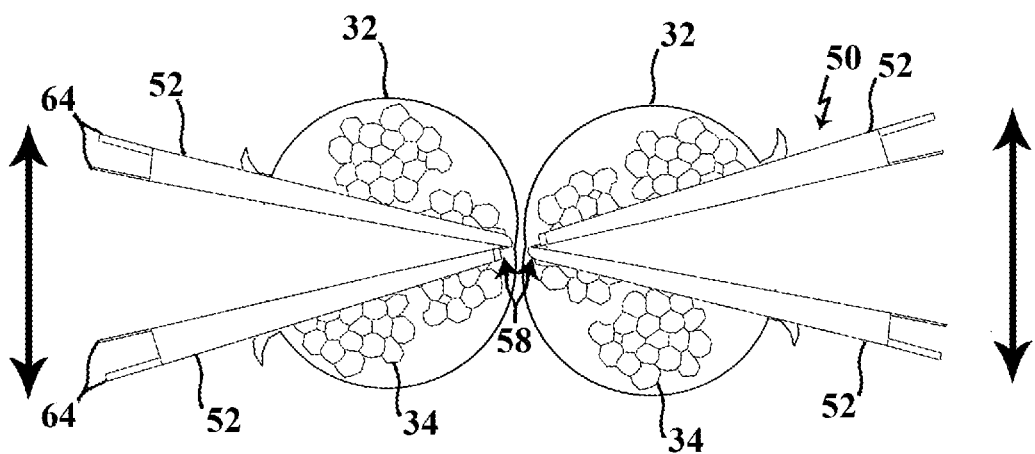
FIG. 10 is an elevational view showing the apparatus of FIG. 8 splitting the pomegranate shown in FIG. 9 into quarters according to one implementation.

As shown in FIG. 11, the handle portion 64 of, each splitting lever 52 can further comprise pair of handles extending from an upper end of the lever to help gently split the rind 32 of the pomegranate 22 apart.

Figure 12:
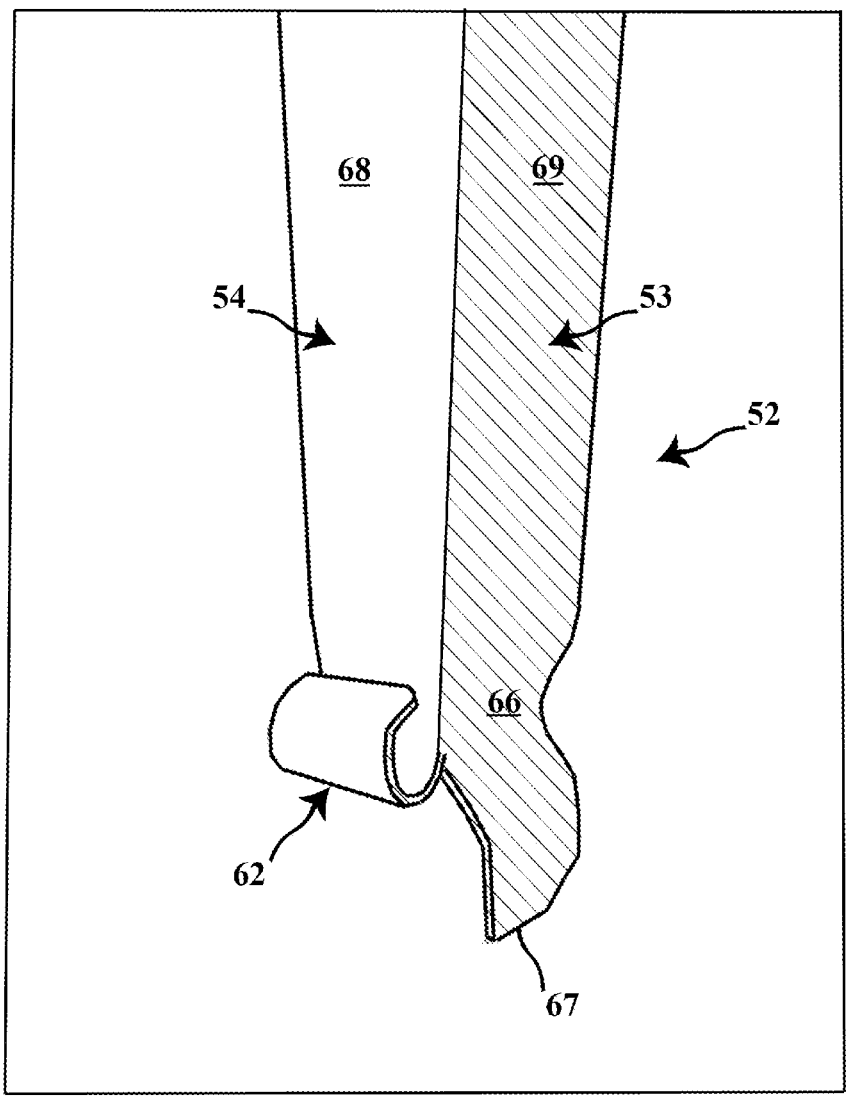
FIG. 12 is a side view of a bottom portion of one of the splitting levers of the apparatus of FIG. 8.

By way of example, FIG. 12 illustrates a bottom portion of one of the elongated splitting levers 52. As shown in FIG. 12, each elongated splitting lever has a first longitudinal side wall 54 and a corresponding second longitudinal side wall 53 which extends substantially perpendicular to first sidewall 54 such that the elongated splitting lever has a substantially symmetrical L-shaped cross section.

In one implementation, each splitting lever 52 is comprised out of a thin rigid material which is bent or folded along a longitudinal axis at a substantially ninety degree angle to form the L-shaped cross section structure. The elongated splitting lever can taper outwardly from the penetrating end to the opposite end to help with insertion through the blossom portion 30 of the pomegranate 22 (see for example FIGS. 9-11).

By way of a non-limiting example, as best shown in FIG. 12, the male component can be a substantially cylinder shaped component 62. Component 62 is located on the exterior of the bottom end of the first longitudinal wall 54 and transverses the first wall. The female component 60 is located in the bottom end of the second longitudinal wall and comprises a grove 66 for receiving the cylinder shaped component 62 of an adjacent lever. The second wall bottom end also includes a protrusion 67 that extends downwardly from below the groove 66.

Figure 13:
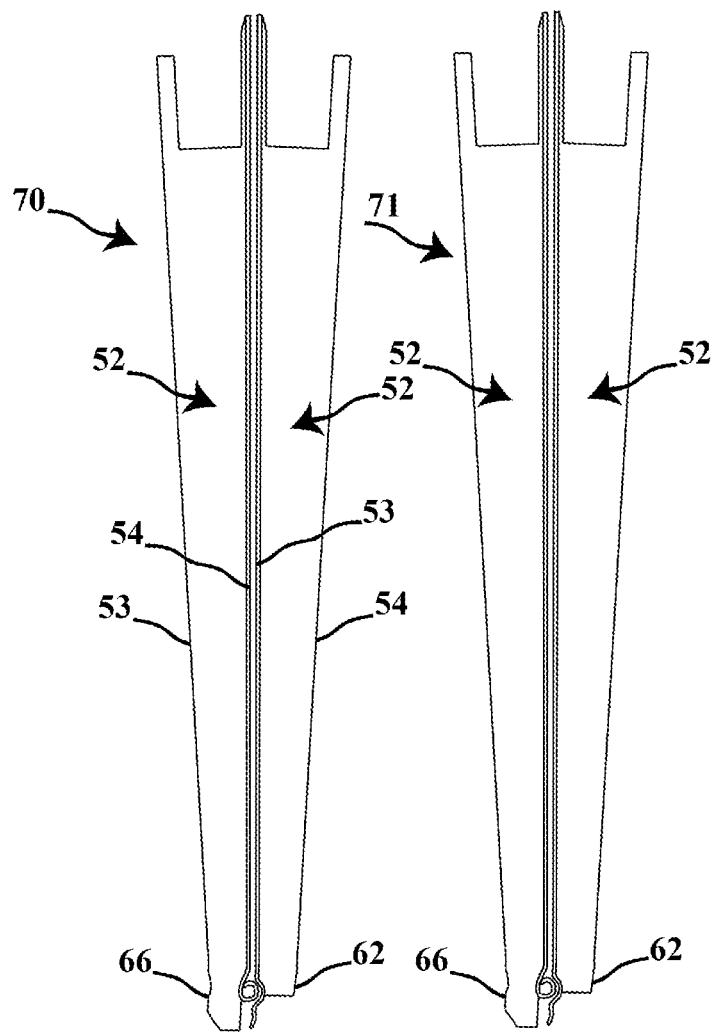
FIG. 13 is a side view of a first pair of hingedly interconnected splitting levers of the apparatus of FIG. 8 and a second pair of hingedly interconnected splitting levers of the apparatus separated from the first pair.

The male and female components 62, 60 are located in substantially vertical alignment and substantially perpendicular to one another such that when the exterior face 68 of the first wall 54 of one of the elongated splitting levers is brought in contact or contiguous with the exterior face 69 of the second wall 53 of another of the elongated splitting levers, the male cylindrical component 62 of the elongated splitting lever is received in the female grove component 66 of the other elongated splitting lever to thereby hingedly interconnect the pair of elongated splitting levers together in a closed configuration with the penetrating protrusions 67 extending downwardly below the hinge (see FIG. 13).

Similarly, a second pair of similar elongated levers can be hingedly connected together in the aforementioned manner. By ways of example, FIG. 12 illustrates the first pair 70 of the elongated splitting levers 52 hingedly interconnected in the closed configuration and the second pair 71 of elongated splitting levers 52 hingedly interconnected in a closed configuration and separated from the first pair of elongated splitting levers. In the closed configuration, each pair 70, 71 of levers forms a T shaped cross section structure in which the second longitudinal wall 54 of one lever and first longitudinal wall 53 of the other lever are arranged in a side by side and substantially co planar configuration and in which the first longitudinal wall 53 of one lever and the second longitudinal wall 54 of the other lever overlap (see in particular FIG. 8 in conjunction with FIG. 13).

The four splitting levers 52 can be hingedly connected together one by one or in pairs. For example, the first and second pairs 70, 71 of levers of FIG. 13 can be arranged together to form the hingedly interconnected four splitting levers 52 by placing the side by side coplanar second and first longitudinal walls 54, 53 of the first pair 70 of levers in contact or contiguous with corresponding side by side coplanar first and second longitudinal walls 53, 54 of the second pair 70 of levers. As a result, the unengaged grove 66 of the first pair 70 receives the unengaged male cylindrical component 62 of the second pair 71 and the unengaged male cylindrical component 62 of the first pair 70 is received in the unengaged groove 66 of the second pair to thereby form the pivoting connecting mechanism of the four way splitting apparatus shown in plan view in FIG. 8. With the four levers pivoted together in a closed configuration, the resulting structure is a cross shaped cross-sectional structure that can efficiently penetrate the pomegranate.

Other male female component configurations that enable similar pivoting functionality as the pivoting mechanism of FIGS. 8-13 can be utilized. Other pivoting mechanisms that enable pivoting of the elongated splitting levers to perform four ways splitting of the pomegranate in the aforementioned manner are envisaged.

A method for four ways splitting a pomegranate according to one implementation will now be described. The method can be performed utilizing the aforementioned apparatus 50 as follows:

1. Hingedly interconnect the four elongated splitting levers 52 together at their penetrating ends using the pivoting mechanism.

2. Pivot the four levers together into a substantially closed configuration in which the elongated levers form the penetrating structure.

3. With the elongated splitting levers in the substantially closed configuration, insert pivotally interconnected penetrating ends 66 into the blossom portion 30 of the pomegranate 22 to penetrate the pomegranate and drive the elongated levers driven through the blossom portion 80 (see FIG. 8) leaving the handle portions 64 protruding from the exterior of the blossom portion.

4. Manually pull apart first directly adjacent pair 70 of levers 52 from second directly adjacent pair 71 of levers 52 to open outwardly and gently split the rind 32 of the pomegranate 22 apart in half to expose the intact arils 34 within the pomegranate 22 (see FIG. 9).

5. Manually pull apart handles 64 of first pair 70 of levers and handles 64 of second pair 71 of levers to open outwardly and gently split each halve rind and thereby split the pomegranate 22 apart in quarters further to expose the intact arils 34 within the pomegranate 22 (see FIG. 10).

6. Disconnect each one of the four splitting levers 52 and store for future use.

In yet another implementation, the apparatus for splitting the pomegranate may have two or three rather than four hingedly interconnected splitting levers for two or three way splitting the pomegranate, respectively.

In yet another implementation, the aforementioned pivoting of the splitting levers of each of the above apparatus may be automated using an appropriate mechanical or electro mechanical device appropriately carried on the elongated levers.

The apparatus of the embodiments described herein are exceedingly easy to use and the lever design ensures that only relatively small application of force is necessary to split the rind apart. The apparatus is so small and light, and so inexpensive to manufacture, that it may be given away with the purchase of pomegranate fruit. Furthermore, whilst the aforementioned apparatus of the embodiments is configured for splitting a pomegranate fruit, the apparatus may be utilized to split apart fruits other than pomegranate fruits.

Whilst the embodiments of the apparatus and methods for splitting a pomegranate fruit described herein refer to penetrating the blossom of the pomegranate for the purpose of splitting the pomegranate apart, spatting of the pomegranate rind can still be achieved via insertion into other parts of the pomegranate and operating the apparatus in the same manner.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

What is claimed is:

1. An apparatus for splitting apart a pomegranate comprising:
   a plurality of elongated splitting levers; wherein said plurality comprises four elongated splitting levers and wherein each one of said plurality of elongated splitting levers has a penetrating end; and
   a pivoting connecting mechanism for hingedly interconnecting said plurality of elongated splitting levers at said penetrating ends, said pivoting connecting mechanism defining a fulcrum about which said elongated levers pivot;
   wherein each one of said plurality of elongated levers has a shape configured to enable the plurality of elongated levers to be arranged in a substantially closed configuration in contact or contiguous lengthways with one another to form a penetrating structure to enable said plurality of elongated levers to be at least partially inserted into the pomegranate; and
   wherein said pivoting connecting mechanism is configured to outwardly pivot a first directly adjacent pair of said elongated levers outwardly in a substantially closed configuration from a second directly adjacent pair of said elongated levers in a substantially closed configuration in response to forcing pulling apart said first pair of elaborated levers from said second pair of elongated levers;
   wherein said pivoting connecting mechanism is further configured to outwardly pivot apart said first pair of said elongated levers from one another in response to forcing apart said first pair of elongated levers;
   wherein said pivoting connecting mechanism is further configured to outwardly pivot apart said second pair of said elongated levers from one another in response to forcing apart said second pair of elongated levers;
   whereby, when said plurality of elongated splitting levers arranged in said substantially closed configuration are at least partially inserted into said pomegranate, forcing apart said first pair of elongated levers from said second pair of elongated levers gently splits a rind of the pomegranate apart to expose intact arils within the pomegranate; and forcing apart said first pair of elongated levers from one another and forcing apart said second pair of elongated levers from one another gently further splits the rind into quarters to expose intact arils within said pomegranate.

2. The apparatus of claim 1, wherein said pivoting connecting mechanism comprises
   a male component and a female component carried at the penetrating end on each one of said four elongated levers;
   wherein said male component of one of said elongated levers is configured to be received by a female component of a next adjacent one of said elongated levers placed in contact or contiguous with said one of said elongated levers;
   wherein said female component of said one of said elongated levers is configured to be received by a male component of a previous adjacent one of said elongated levers in contact or contiguous with said one of said elongated levers.

3. The apparatus of claim 1, wherein each one of said elongated levers has a first and second longitudinal sidewalls, wherein said first and second longitudinal sidewalls are substantially perpendicular such that said each one of said elongated levers has an L shaped cross section and such that said four elongated levers can be arranged in contact or contiguous lengthways with one another to form a penetrating structure having a + cross section.

4. The apparatus of claim 3, wherein said pivoting connecting mechanism comprises a transversely extending male cylindrical shaped component carried on a penetrating end of each one of said first longitudinal sidewalls; and a transversely extending female groove carried on the penetrating end of each one of said second longitudinal sidewalls;
   wherein said male cylindrical component of one of said elongated levers is received by a female component of a next adjacent one of said elongated levers arranged in contact or contiguous lengthways with said one of said elongated levers;
   wherein said female component of said one of said elongated levers is received by a male cylindrical component of a previous adjacent one of said elongated levers arranged lengthways in contact or contiguous with said one of said elongated levers.

5. The apparatus of claim 4, wherein each one of said elongated levers comprises a sheet metal elongated lever;
   wherein said first and second longitudinal walls of each of said levers comprise
   sheet metal folded along a longitudinal axis at substantially 90 degrees;
   wherein said male cylindrical component of each one of the levers comprises the bottom end of the first longitudinal wall rolled in on itself; and
   wherein said female groove of each one of the levers comprises a groove or bend formed in the bottom end of the second longitudinal wall.

6. The apparatus of claim 5, wherein said bottom end of said second longitudinal wall of each one of said levers further comprises a penetrating protrusion extending downwardly from said groove or bend.

7. The apparatus of claim 1, further comprising at least one magnet carried on each one of said elongated levers for helping align said adjacent splitting levers together in said substantially closed configuration.

8. The apparatus of claim 1, wherein said elongated levers are configured to be manually forcible apart from said substantially closed configuration to said substantially open configuration.

9. The apparatus of claim 1, wherein each one of said plurality of elongated splitting levers comprises a sheet metal elongated lever.

10. The apparatus of claim 1, wherein each one of said elongated splitting levers comprises a handle portion remote from said penetrating end such that, when said levers are at least partially inserted into said pomegranate, said handle portions protrude outwardly from said pomegranate; and
    wherein said pivoting connecting mechanism is further configured to outwardly pivot said elongated splitting levers into said open configuration in response to manually pulling apart said handle portions.

11. An apparatus for splitting apart a pomegranate comprising:
    a plurality of elongated splitting levers; wherein said plurality comprises four elongated splitting levers and wherein each one of said plurality of elongated splitting levers has a penetrating end; and a pivoting connecting mechanism for hingedly interconnecting said plurality of elongated splitting levers at said penetrating ends, said pivoting connecting mechanism defining a fulcrum about which said elongated levers pivot;

wherein each one of said plurality of elongated levers has a shape configured to enable the plurality of elongated levers to be arranged in a substantially closed configuration in contact or contiguous lengthways with one another to form a penetrating structure to enable said plurality of elongated levers to be at least partially inserted into the pomegranate; and wherein said pivoting connecting mechanism comprises:
a male component and a female component carried at the penetrating end on each one of said four elongated levers;

wherein said male component of one of said elongated levers is configured to be received by a female component of a next adjacent one of said elongated levers placed in contact or contiguous with said one of said elongated levers;

wherein said female component of said one of said elongated levers is configured to be received by a male component of a previous adjacent one of said elongated levers in contact or contiguous with said one of said elongated levers; and wherein said pivoting connecting mechanism is configured to outwardly pivot a first directly adjacent pair of said elongated levers outwardly in a substantially closed configuration from a second directly adjacent pair of said elongated levers in a substantially closed configuration in response to forcing pulling apart said first pair of elaborated levers from said second pair of elongated levers;

wherein said pivoting connecting mechanism is further configured to outwardly pivot apart said first pair of said elongated levers from one another in response to forcing apart said first pair of elongated levers;

wherein said pivoting connecting mechanism is further configured to outwardly pivot apart said second pair of said elongated levers from one another in response to forcing apart said second pair of elongated levers;

whereby, when said plurality of elongated splitting levers arranged in said substantially closed configuration are at least partially inserted into said pomegranate, forcing apart said first pair of elongated levers from said second pair of elongated levers gently splits a rind of the pomegranate apart to expose intact arils within the pomegranate; and forcing apart said first pair of elongated levers from one another and forcing apart said second pair of elongated levers from one another gently further splits the rind into quarters to expose intact arils within said pomegranate.

12. The apparatus of claim 11, wherein each one of said elongated levers has a first and second longitudinal sidewalls, wherein said first and second longitudinal sidewalls are substantially perpendicular such that said each one of said elongated levers has an L shaped cross section and such that said four elongated levers can be arranged in contact or contiguous lengthways with one another to form a penetrating structure having a + cross section.

13. The apparatus of claim 12, wherein each male component comprises a transversely extending male cylindrical shaped component carried on a penetrating end of each one of said first longitudinal sidewalls; and wherein each female component comprises a transversely extending female groove carried on the penetrating end of each one of said second longitudinal sidewalls; and wherein said male cylindrical component of one of said elongated levers is received by the female component of a next adjacent one of said elongated levers arranged in contact or contiguous lengthways with said one of said elongated levers;

wherein said female component of said one of said elongated levers is received by the male cylindrical component of a previous adjacent one of said elongated levers arranged lengthways in contact or contiguous with said one of said elongated levers.

14. The apparatus of claim 13, further comprising at least one magnet carried on each one of said elongated levers for helping align said adjacent splitting levers together in said closed configuration.

15. The apparatus of claim 13, wherein said elongated levers are configured to be manually forcible apart from said substantially closed configuration to said substantially open configuration.

16. The apparatus of claim 13, wherein each one of said elongated levers comprises a sheet metal elongated lever;
wherein said first and second longitudinal walls of each of said levers comprise
sheet metal folded along a longitudinal axis at substantially 90 degrees;
wherein said male cylindrical component of each one of the levers comprises the bottom end of the first longitudinal wall rolled in on itself; and
wherein said female groove of each one of the levers comprises a groove or bend formed in the bottom end of the second longitudinal wall.

17. The apparatus of claim 16, wherein said bottom end of said second longitudinal wall of each one of said levers further comprises a penetrating protrusion extending downwardly from said groove or bend.

* * * * *